(12) United States Patent
Huth et al.

(10) Patent No.: US 12,548,384 B2
(45) Date of Patent: Feb. 10, 2026

(54) COMPUTER-IMPLEMENTED METHOD FOR PREVENTING LOSS OF FUNCTION IN CASE OF DISTURBANCE OF A CONNECTION TO A BACKEND IN A COMMUNICATION SYSTEM

(71) Applicant: Robert Bosch GmbH, Stuttgart (DE)

(72) Inventors: Christopher Huth, Heilbronn (DE); Arne Nordmann, Stuttgart (DE); Martin Ring, Lossburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 160 days.

(21) Appl. No.: 18/182,224

(22) Filed: Mar. 10, 2023

(65) Prior Publication Data
US 2023/0368586 A1 Nov. 16, 2023

(30) Foreign Application Priority Data
May 10, 2022 (DE) .................. 10 2022 204 557.2

(51) Int. Cl.
*G07C 5/00* (2006.01)
*G06F 21/44* (2013.01)
*H04W 4/40* (2018.01)

(52) U.S. Cl.
CPC ........... *G07C 5/008* (2013.01); *G06F 21/445* (2013.01); *H04W 4/40* (2018.02)

(58) Field of Classification Search
CPC ......... G07C 5/008; H04W 4/40; G06F 21/445
See application file for complete search history.

(56) References Cited

U.S. PATENT DOCUMENTS

| | | | | |
|---|---|---|---|---|
| 2015/0369617 A1* | 12/2015 | Ding | ..................... | H04W 8/183 |
| | | | | 701/428 |
| 2018/0032908 A1* | 2/2018 | Nagaraju | ............. | G06F 11/3072 |
| 2019/0047581 A1* | 2/2019 | Bai | ......... | G06F 9/5027 |
| 2020/0018609 A1* | 1/2020 | Nagy | .................. | G05D 1/0088 |
| 2020/0409369 A1* | 12/2020 | Zaytsev | ............... | G06F 11/3664 |
| 2022/0395975 A1* | 12/2022 | Cachet | ..................... | G06N 7/01 |
| 2023/0243661 A1* | 8/2023 | Huang | ............... | G01C 21/3492 |
| | | | | 701/482 |

FOREIGN PATENT DOCUMENTS

WO 2020205597 A1 10/2020

OTHER PUBLICATIONS

Danny Weyns: "Architecture-Based Design of Multi-Agent Systems," Ch. 3.1.2., pp. 30-32, Springer Berlin, (2010), ISBN 978-3-642-01064-4.

\* cited by examiner

*Primary Examiner* — Todd Melton
*Assistant Examiner* — Matthew Ho
(74) *Attorney, Agent, or Firm* — NORTON ROSE FULBRIGHT US LLP

(57) ABSTRACT

A computer-implemented method for preventing loss of function in a local instance when there is a disturbance of a connection to a backend in a communication system that has a local instance having a local agent and a backend acting in part as a global agent, an agent designating a unit that is designed to achieve defined goals through autonomous behavior. The method includes, when there is a connection to the backend, the providing of the function by the global agent, which receives backend information from the backend during the providing of the function, and, if a connection to the backend is disturbed, the providing of the function by the local agent.

14 Claims, 3 Drawing Sheets

COMPUTER-IMPLEMENTED METHOD FOR PREVENTING LOSS OF FUNCTION IN CASE OF DISTURBANCE OF A CONNECTION TO A BACKEND IN A COMMUNICATION SYSTEM

CROSS REFERENCE

The present application claims the benefit under 35 U.S.C. § 119 of German Patent Application No. DE 10 2022 204 557.2 filed on May 10, 2022, which is expressly incorporated herein by reference in its entirety.

FIELD

Many software systems are based on the principle of layered structure, in which a higher layer can access a lower layer. An example of a two-layer architecture is the client-server system. Here, the server can be called the backend, which provides resources for the client, which can be called the frontend. Here, the frontend is the local instance closer to the user and the backend is the more distant system. Through a multilayer structure, local resources (hardware and software) can be saved at the frontend if, for example, the backend is used to store large amounts of data or to perform complex computing operations that can then be retrieved by the frontend. Problems arise when the communication from a local instance to a backend is disturbed or has failed completely and the backend can no longer provide local instances with the necessary services or data required for local functions. This can then lead to an undesired functional failure. Examples of backend-frontend communication with possible connection disturbances can be found in, inter alia, mobile radiotelephone communications, mobile robotics, the "Internet of Things," or mobility. Particular attention has been paid most recently to the development of methods for autonomous and/or assisted driving. Here there can be a risk of connection failures for example when a vehicle is in an area with poor network coverage or due to traffic infrastructure such as tunnels or underpasses. It can happen that some systems in the vehicle that are local instances can no longer communicate with the backend and do not receive necessary data or information, which can lead to functional disturbances in the vehicle, or certain functions are no longer available to the user. Examples of this could include current traffic information for route planning or avoiding traffic congestion, or information about the charging network in the area of electric mobility. A good system design must take into account the unavailability of basic services and information from the backend, which can generally be accompanied by a noticeably worse user experience. There is thus a need for a solution to maintain functionality in case of a disturbance of a connection to a backend. The examples named above are not limiting, but are intended to illustrate the problems presented.

SUMMARY

A first general aspect of the present invention relates to a computer-implemented method for preventing loss of function in a local instance when there is a disturbance of a connection to a backend in a communication system having a local instance that has a local agent and a backend acting in part as a global agent, an agent designating a unit that is designed to achieve defined goals through autonomous behavior. According to an example embodiment of the present invention, the method includes, when there is a connection to the backend, the providing of the function by the global agent, which receives backend information from the backend during the providing of the function. The method further includes, when a connection to the backend is disturbed, the providing of the function by the local agent.

A second general aspect of the present invention relates to a computer system designed to carry out the computer-implemented method for preventing loss of function in a local instance when there is a disturbance of a connection to a backend in a communication system according to the first general aspect (or an embodiment thereof).

A third general aspect of the present invention relates to a computer program designed to carry out the computer-implemented method for preventing loss of function in a local instance when there is a disturbance of a connection to a backend in a communication system according to the first general aspect (or an embodiment thereof).

A fourth general aspect of the present invention relates to a computer-readable medium or signal that stores and/or contains the computer program according to the third general aspect (or an embodiment thereof).

The example method provided in accordance with the present invention according to the first general aspect (or an embodiment thereof) can, in many situations, prevent a loss of function in a local instance when there is a disturbance of a connection to a backend in a communication system. An advantage can be that through the proposed method the dependence of the local instance on the permanent connection to the backend can be reduced, and the failure of a function can be avoided. As a result, a user may not become aware of the disturbance of the connection, and may not experience any disadvantages. Through the method provided herein, if there is a connection to the backend, a function can be provided by a global agent that receives backend information from the backend. If a connection to the backend is disturbed, the function can be provided by a local agent.

Another advantage is that the learning process of the local agent can take place when the backend provides the function. In this way, the local agent can learn the same behavior as the global agent without itself providing the function. If a connection to the backend is disturbed, the local agent can seamlessly take over the task of the global agent and provide the function. In doing so, the local agent can continue its learning process and achieve a higher level of quality. A further advantage can be that the global agent, as part of the backend, can also learn from other global agents and thus achieve a higher quality level. The method disclosed herein can ensure that the user is provided with sustained functionality independently of disturbance of the connection to the backend. Here the functionality in the case of a fault does not have to be different from the functionality that exists when a connection to the backend is not disturbed. The user-friendliness and user experience can be maintained even when there is a disturbance of the connection to the backend, because the user does not need to become aware of a connection disturbance.

Some terms are used in the present disclosure in the following manner:

A "local instance" can be a unit closer to the possible user for data processing, control of a downstream device and/or downstream process, or monitoring of the like. The local instance can be in a field with a plurality of local instances. For example, a local instance can be a system in a vehicle, a system in a robot, a system in a machine tool, an industrial machine and/or plant, a single system unit in a larger computer system, or a wearable data processing unit (wearable computer).

A "function" can be for example a computing operation, a data processing rule, an instruction for action to downstream methods, a display of information to a user or, for example, the controlling of a fully automated or partly automated process. A function can be offered in a local instance (i.e. the local instance provides the function). In a local instance, a plurality of functions can also be offered. A function can in some examples be a function for autonomous and/or assisted driving. For example, accelerating a vehicle or displaying driving information (e.g., speed, estimated time of arrival) can be a function.

A "backend" can be for example a computing unit. A backend can be for example mobile or stationary. Further, a backend can include for example a system for storing data or performing computing operations. A backend can also include a system for data evaluation and/or a system for creating control presets.

A technical "agent" can be a delimitable hardware unit and/or software unit with defined goals. A technical agent can strive to achieve these goals through autonomous behavior and in doing so can interact with its environment and with other agents. An agent can act through actions as a function of different states of the environment. Through an action, an environment of an agent can be changed from a state to a successor state. The agent can also be given a reward for its action.

An "action" can, for example, be an instruction for behavior to downstream systems (e.g., to one or more actuators) and/or processing steps. For example, an action can be analog and/or digital in nature. An action can be part of a set of actions from which an agent selects a particular action in a particular situation.

An "environment" can be a physical space or simulated space (simulated or modeled by a computer system, for example) or a situation in which an agent can be located. For example, the situation can be a specific traffic situation (e.g., a traffic jam or a road intersection). The environment can have different states (e.g. green traffic light or red traffic light in different lanes) that an agent can assume. An environment should be observable. An environment can be partially observable or fully observable.

A "state" can be a totality or a part of a totality of information that describes current properties of an environment. For example, a state can be determined from data collected about an environment, for example by suitable means of sensor technology (e.g. optical, acoustic, inductive, capacitive, and/or tactile measuring systems, e.g. camera-based systems, LIDAR systems, RADAR systems; ultrasonic measurement systems, and/or temperature measurement systems), means for geographic location, and/or time measurement. A state can be an expression of a situation in an environment in which an agent can be located (for example, a green light in the lane the agent is in). A state can be dependent on a time step.

A "global agent" is an agent that can be in the backend or can be a part of the backend. The global agent can receive backend information from the backend for providing a function.

A "local agent" is an agent that can be in the local instance or can be a part of the local instance.

"Backend information" can be information stored and/or processed on a backend and that can be provided to a global agent. The information can be location-related information (e.g., location-specific) or time-related information (e.g., time of day and/or time of year), as well as information from a larger entity such as the World Wide Web, such as weather information, traffic information, (road) map information, or any other type of information that can be necessary for a global agent to provide a function.

A "communication system" can be a network for exchanging information in the form of data. The communication system is not limited to a specific technology. The communication system can be for example a computer network or a Local Area Network (LAN) or, for example, a public or non-public wide area network (WAN).

A "connection disturbance" or "a disturbed connection" can be an event or situation in which the transmission of data from the local instance to the backend or from the backend to the local instance is only partially possible or not possible at all (e.g., a complete termination of the connection or a reduction of a quality of service of a connection). For example, a connection disturbance can be caused by a natural event and/or weather event, an area of poor network coverage, traffic infrastructure conditions such as tunnels or underpasses, or also, for example, by the failure of technical equipment such as a transmitter module and/or receiver module for an information-carrying signal. A connection can be understood here as bidirectional. In other words, it makes no difference whether one speaks here of a connection from a local instance to a backend or from a backend to a local instance.

A "vehicle" can be any device that transports passengers and/or freight. A vehicle can be a motor vehicle (for example, a car or a truck), but also a rail vehicle. A vehicle can also be a motorized, non-motorized, and/or muscular force-powered two- or three-wheeled vehicle. However, floating and flying devices can also be vehicles. Vehicles can operate at least partly autonomously or in assisted fashion.

DETAILED DESCRIPTION OF EXAMPLE EMBODIMENTS

Figure 1:
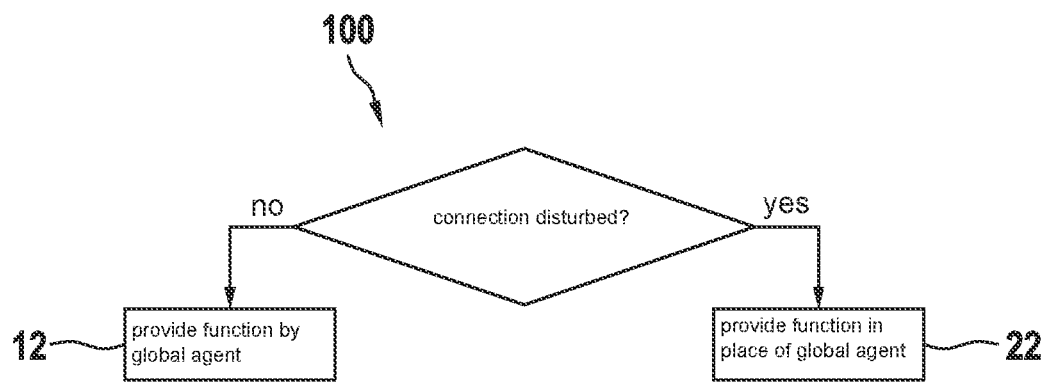
FIG. 1 schematically illustrates a computer-implemented method for preventing loss of function in a local instance when there is a disturbance of a connection to a backend in a communication system, according to an example embodiment of the present invention.

According to an example embodiment of the present invention, a computer-implemented method 100 is disclosed for preventing loss of function in a local instance when there is a disturbance of a connection to a backend in a communication system having a local instance 20 that has a local agent 21 and a backend 10 acting in part as a global agent 11, an agent designating a unit that is designed to use autonomous behavior to achieve defined goals.

Figure 4:
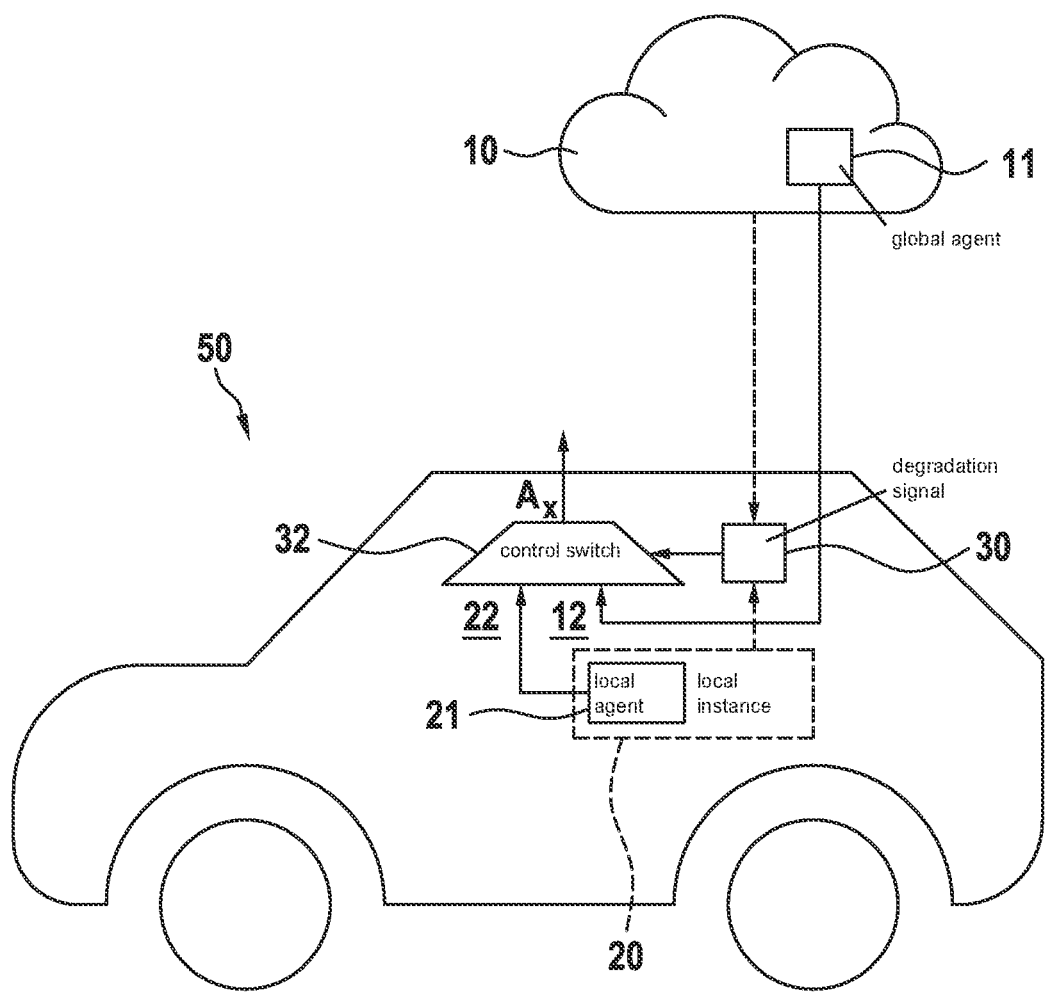
FIG. 4 schematically illustrates an exemplary system for carrying out the computer-implemented method for preventing loss of function in a local instance when there is a disturbance of a connection to a backend in a communication system, for the example of a vehicle, according to an example embodiment of the present invention.

Local instance 20 can be coupled to backend 10 for the exchange of data. Method 10 further includes, when there is a connection to backend 10, a providing 12 of the function by the global agent 11, which receives backend information from backend 10 during the providing of the function. Global agent 11 can provide the function via a connection to local instance 20. FIG. 4 shows, for the example of a vehicle 50, an exemplary system that enables global agent 11 to provide a function when there is a connection from local instance 20 to backend 10. For the providing 12 of the function, global agent 11 can use backend information that global agent 11 receives from backend 10.

Method 100 further includes, when a connection to the backend 10 is disturbed, provision 22 of the function by local agent 21. Local agent 21 can take over the providing 22 of the function in place of global agent 11 when a connection from local instance 20 to backend 10 is disturbed. FIG. 1 shows this method step.

Figure 2A:
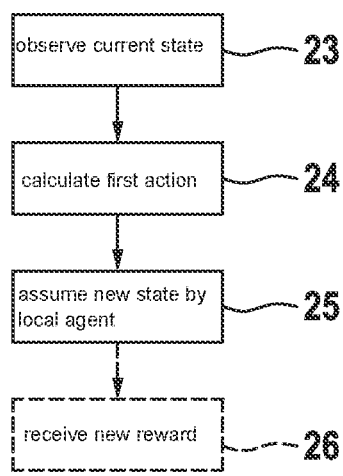
FIG. 2A schematically illustrates exemplary steps of a method for preventing loss of function according to an example embodiment of the present invention, the method steps being executable by a local agent.

FIG. 2A shows possible method steps of method 100 that can be carried out by local agent 21; these method steps are described below.

Method 100 can further include observation 23 of its current state $S_1$ in the environment by local agent 21. The observation 23 can include the (incomplete) acquisition of information about an environment from the perspective of local agent 21, a current state $S_1$ being determinable from the information. Observation 23 can be carried out, for example, by sensor equipment (e.g. optical, acoustic, inductive, capacitive and/or tactile measurement systems, e.g. camera-based systems, LIDAR systems, RADAR systems; ultrasonic measurement systems and/or temperature measurement systems), means for geographic location and/or time measurement. Observation 23 can include all means of obtaining data. Observation 23 can also include signal processing, signal preparation, and/or making the signals usable in the form of data for subsequent method steps. Observation 23 can be, for example, a regular process, a continuous and/or ongoing process, an irregular and/or event-based process.

Method 100 can further include calculating 24 of a first action $A_1$ based on the current state $S_1$ by local agent 21 in order to provide the function when a connection to backend 10 is disturbed.

First action $A_1$ can also be calculated if there is a connection to backend 10 and local agent 21 does not provide the function. In this case, the first action $A_1$ has no influence on the environment. Through a first action $A_1$, a local agent 21 can influence the environment in order to provide a function when a connection from local instance 20 to backend 10 is disturbed. For example, as shown in FIG. 4, a vehicle can be an exemplary specific embodiment. Here, a local instance 20 can be a system in this vehicle 50. For example, in this embodiment, the acceleration of vehicle 50 can be a function that is provided via a first action $A_1$ by local agent 21 when a connection from the local instance 20 to the backend 10 is disturbed.

Method 100 can further include the assuming 25 of a new state $S_3$ by local agent 21. Through first action $A_1$, the local agent can be in the new state $S_3$. To illustrate this, the embodiment with vehicle 50 of FIG. 4 can be used as an example. In this exemplary embodiment, a new state $S_3$ can be an accelerated state of vehicle 50. In general, in accordance with all specific embodiments, as shown in FIG. 3 the new state $S_3$ can become a current state $S_1$, on which the calculation 24 of a first action $A_1$ is based.

Figure 3:
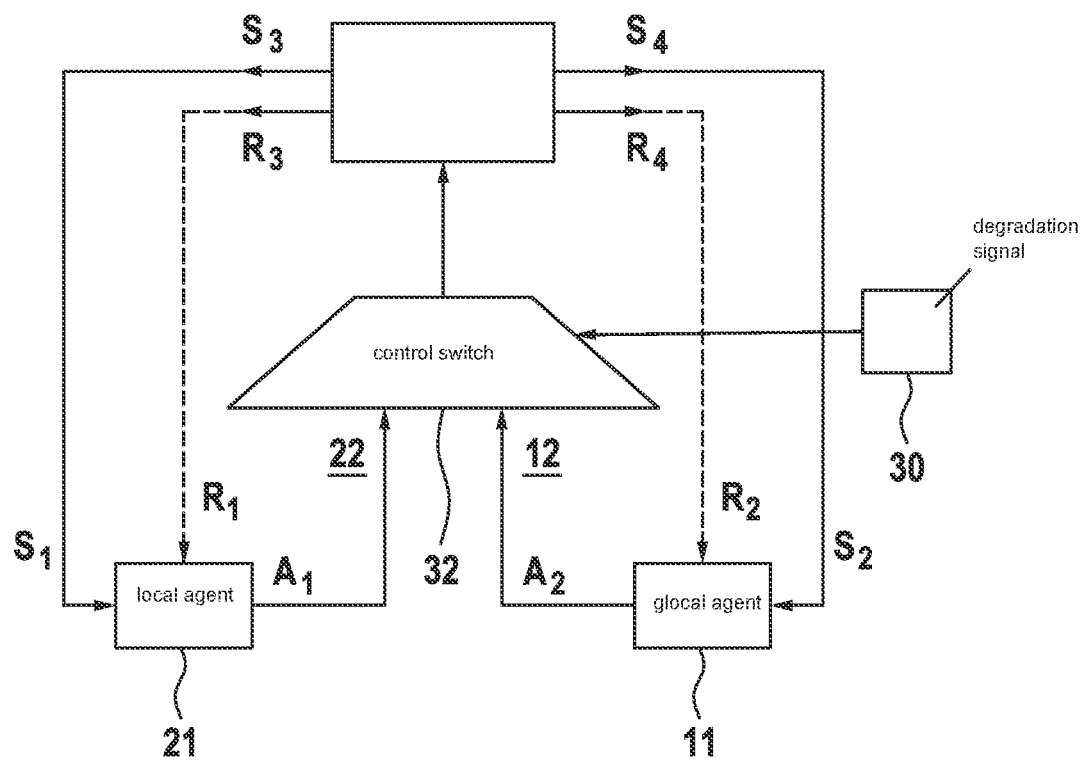
FIG. 3 schematically illustrates a system for carrying out the computer-implemented method for preventing loss of function in a local instance when there is a disturbance of a connection to a backend in a communication system, according to an example embodiment of the present invention.

Additionally, as shown in FIG. 3, the calculation 24 of a first action $A_1$ by the local agent 21 can be based on its current reward $R_1$ and can include the assumption 25 of a new state $S_3$ in addition to the receiving 26 of a new reward $R_3$ by the local agent 21.

Alternatively, a physical or learned model of the environment can be used to determine the new state $S_3$ and/or to generate the new reward $R_3$. Alternatively, the new reward $R_3$ can be generated by a mathematical equation. The current reward $R_1$ and/or the new reward $R_3$ can be numerical values. If the calculation 24 of first action $A_1$ is additionally based on its current reward $R_1$ and the assuming 25 of a new state $S_3$ additionally includes receiving a new reward $R_3$, method steps 23, 24 and 25 can be method steps for training local agents 21, where the training can be reinforcement learning. In some examples, reinforcement learning can be based on a Markov decision problem. The calculation 24 of a first action $A_1$ by local agent 21 can here act to maximize an expected total reward (which does not always mean that a local or even global maximum is also reached). In this way, local agent 21 can improve its strategy, a strategy including at least that each state can be assigned an action (deterministic) or each action can be selected with a certain probability from a state (non-deterministic).

Furthermore, as a basis for the observing 23 of a current state in the environment, for the calculating 24 of first action $A_1$ and/or for the assuming 25 of a new state by local agent 21, features can be used that are available to local instance 20 even if a connection to backend 10 is disturbed. For example, a feature that is available to local instance 20 even if there is no connection to backend 10 or a connection to backend 10 is disturbed can be generated from data from a measurement system located in or at local instance 20 and/or connected thereto (e.g. in a vehicle). In addition or alternatively, a feature can be generated from data in a memory located in or at the local instance and/or connected thereto (e.g. in a vehicle). In some examples, a feature can be a time of day or a day of the week. Due to the fact that, as a basis for the method steps named above, features can be used that are available to local instance 20 even if there is no connection to backend 10 or if a connection to the backend is disturbed, it can be ensured that local agent 21 can provide the function when a connection to backend 10 is disturbed. Alternatively, a new reward $R_3$ can be generated based on features that are available to local instance 20 even when a connection to backend 10 is disturbed.

Figure 2B:
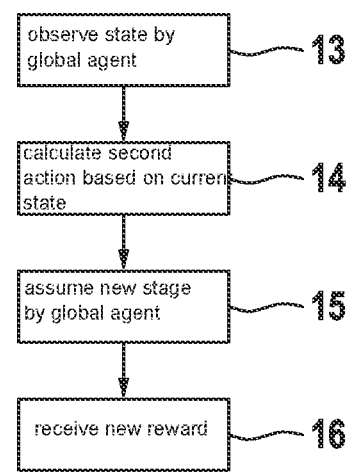
FIG. 2B schematically illustrates exemplary method steps of the method for preventing loss of function according to an example embodiment of the present invention, the method steps being executable by a global agent.

FIG. 2B shows possible steps of method 100 that can be carried out by local agent 11; these method steps are described below.

Method 100 can further include observation 13 of its state $S_2$ in the environment by global agent 11, calculation 14 of a second action $A_2$ based on its current state $S_2$ by the global agent, assumption 15 of a new state $S_4$ by global agent 11 if the connection from local instance 20 to backend 10 is not disturbed. The observation 13 can include the (incomplete) acquisition of information about an environment from the perspective of local agent 11, a current state $S_3$ being determinable from the information.

Here the observation 13 can be carried out for example by means of the sensor equipment (e.g. optical, acoustic, inductive and/or tactile measurement systems, e.g. camera-based systems, LIDAR systems, RADAR systems; ultrasonic measurement systems and/or temperature measurement systems), means for geographic location and/or time measurement. Observation 13 can include all means of obtaining data.

Observation 13 can also include signal processing, signal preparation, and/or making the signals usable in the form of data for subsequent method steps. Observation 13 can be, for example, a regular process, a continuous and/or ongoing process, an irregular and/or event-based process. Through a second action $A_2$, a global agent 11 can influence the environment to provide a function when there is a connection from local instance 20 to backend 10. For example, as shown in FIG. 4, a vehicle 50 can be an exemplary specific embodiment. A local instance 20 can here be a system in this vehicle 50.

For example, in this embodiment, accelerating the vehicle 50 can be a function provided through a second action $A_2$ by global agent 11 when there is a connection from local instance 20 to backend 10. Through second action $A_2$, the global agent can be in the new state $S_4$. To illustrate this, the embodiment with vehicle 50 of FIG. 4 can be used as an example. In this exemplary embodiment, a new state $S_4$ can be an accelerated state of vehicle 50. In general, in accordance with all embodiments, as shown in FIG. 3, the new state $S_4$ can become a current state $S_2$ on which the calculation 14 of a second action $A_2$ is based. Alternatively, the current state $S_1$ of the local agent and the current state $S_2$ of the global agent can be the same state. Further, alternatively, the new state $S_3$ of local agent 21 and the new state $S_4$ of global agent 11 can be the same state.

Additionally, as shown in FIG. 3, the calculation 14 of a second action $A_2$ by global agent 11 can be based on its current reward $R_2$ and can include the assuming 15 of a new state $S_4$ in addition to the receiving 16 of a new reward $R_4$ by global agent 11.

Alternatively, a physical or learned model of the environment can be used to determine the new state $S_4$ and/or to generate the new reward $R_3$. Alternatively, the new reward $R_4$ can be generated by a mathematical equation. The current reward $R_2$ and/or the new reward $R_4$ can be numerical values. If the calculation 14 of first action $A_1$ is additionally based on its current reward $R_2$ and the assuming 15 of a new state $S_4$ additionally includes the receiving 16 of a new reward $R_4$, method steps 13, 14 and 15 can be method steps for training local agents 11, where the training can be reinforcement learning. In some examples, reinforcement learning can be based on a Markov decision problem. The calculation 14 of a second action $A_2$ by global agent 11 can here be used to maximize an expected total reward. As a result, global agent 11 can improve its strategy, where strategy includes at least that each state can be assigned an action (deterministic) or each action can be selected with a certain probability from a state (non-deterministic).

In some examples, backend 10 can act in part as a plurality of global agents 11, and one global agent 11 of the plurality of global agents can receive rewards from other global agents. Due to the plurality of global agents 11, each global agent 11 of the plurality of global agents can learn from any other global agent of the plurality of global agents, in that each global agent 11 can receive rewards from the other global agents. A global agent 11 can alternatively be coupled to a plurality of local instances 20. The plurality of local instances 20 can include, for example, ≥1, ≥2, ≥5, ≥10, ≥50, or ≥100 local instances 20 (e.g. between 3 and 20 local instances). A local instance 20 can alternatively be coupled to a plurality of local instances 11.

Further, the current reward $R_1$ and/or the new reward $R_3$ of local agent 21 can be the same as the current reward $R_2$ and/or the new reward $R_4$ of global agent 11, so that local agent 21 learns to emulate the behavior of global agent 11 and, when a connection to the backend is disturbed, calculates a first action $A_1$ that is the same as the second action $A_2$ that the global agent would calculate if the connection to the backend existed.

As described above, local agent 21 can also calculate 24 a first action $A_1$ if there is a connection to backend 10 and local agent 21 does not provide the function.

Nevertheless, the calculation 24 of the first action $A_1$ by local agent 21 can be based on its current reward $R_2$ in addition to its current state $S_1$, and the assuming 15 of a new state $S_4$ can additionally include the receiving 16 of a new reward $R_3$ by local agent 21, where the new reward $R_3$ of local agent 21 can be the same as the new reward $R_4$ of global agent 11. Through this process, if there is a connection to backend 10 and global agent 11 provides the function, local agent 21 can learn the same behavior as global agent 11, or, in other words, through this process local agent 21 can emulate the behavior of global agent 11 in such a way that local agent 21, when a connection to the backend is disturbed, can calculate a first action $A_1$ that is the same as the second action $A_2$ that global agent 11 would calculate if the connection to backend 10 existed or was not disturbed, and/or can provide the function in such a way that the provided function corresponds to the function that global agent 11 would provide if the connection to the backend 10 existed or was not disturbed. The emulation or imitation of global agent 11 by local agent 21 allows local agent 21 to immediately provide the function when a connection to backend 10 is disturbed.

In some examples, a degradation signal 30 can indicate whether there is a risk of a disturbance of the connection of local instance 20 to backend 10. Degradation signal 30 is shown as an example in FIG. 3 and FIG. 4.

In some examples, degradation signal 30 can control a switch 32 in order to allow the first action $A_1$ calculated by local agent 21 to influence the environment when a connection to backend 10 is disturbed. As explained above, local agent 21 can provide the function when a connection to backend 10 is disturbed. Here the function can be provided through the first action $A_1$, degradation signal 30 being able to control switch 32 to allow the first action $A_1$ to affect the environment. In some examples, the switch can be implemented as a multiplexer, where a multiplexer can be a (semiconductor) selection circuit that selectively forwards the signal of action $A_1$ of local agent 21 based on the degradation signal. The selection circuit can be implemented as a software solution in some examples.

Degradation signal 30 can be generated by backend 10, or can be generated on the basis of a spontaneous connection disturbance, or can be generated by local instance 20. For example, degradation signal 30 can be generated based on the entry of backend 10 and/or of global agent 11 into an idle state or, for example, the need for updating or maintenance of backend 10 and/or of global agent 11. Further, a degradation signal 30 can be generated due to any and all reasons for unavailability of backend 10 and/or global agent 11. Alternatively, the degradation signal 30 can be generated when a connection disturbance is indicated for example by a weakening or reduction in signal strength, or when it is known that local instance 20 is approaching or is already in, for example, an area having weaker network coverage, or, generally speaking, that local instance 20 can enter a state in which there is a risk of a disturbance of the connection to backend 10. For example, degradation signal 30 can also be generated based on additional information about local, temporal, or technical conditions. Degradation signal 30 can also be generated for example based on the absence of data packets in the communication between local instance 20 and backend 10. In an exemplary implementation, degradation signal 30 can be reset when a heartbeat message is received from backend 10 and/or from global agent 11, so that global agent 11 can again provide the function. For example, a heartbeat message can be sent by backend 10 and/or global agent 11 continuously, or at regular or irregular intervals. Here, the heartbeat message can be a notification from backend 10 and/or global agent 11 to local instance 20 and/or to local agent 21 that backend 10 and/or global agent 11 is operationally ready, or, colloquially, "alive."

In some examples, local instance 20 can be situated as a system in a vehicle 50 and/or the function being capable of being used for autonomous and/or assisted driving. FIG. 4 illustrates an exemplary implementation of method 100 in a vehicle 50. Here local instance 20 is situated as a system in this vehicle 50. A plurality of local instances 20 can be situated as systems in this vehicle 50. For example, ≥1, ≥2, ≥5, ≥10, ≥50, or ≥100 local instances 20 can be situated as systems in vehicle 50. Alternatively, a plurality of vehicles 50, each having a plurality of local instances 20 situated therein, can be in a field. The function can be provided through a second action $A_2$ calculated by global agent 11 if there is a connection to backend 10. If a degradation signal 30 indicates that there is a risk of a connection disturbance of local instance 20 to backend 10, local agent 21 can provide the function through a first action $A_1$.

Further disclosed is a computer system designed to carry out computer-implemented method 100 for preventing loss of function in a local instance 20 when there is a disturbance of a connection to a backend 10 in a communication system. The computer system can include at least one processor and/or at least one working memory. The computer system can further include a (non-volatile) memory. In addition, local instance 20 and/or local agent 21 can be a computer system. Local instance 20 and/or local agent 21 can include at least one processor and/or a working memory. Local instance 20 and/or local agent 21 can further include a (non-volatile) memory. In addition, backend 10 and/or global agent 11 can be a computer system. Backend 10 and/or global agent 11 can include at least one processor and/or a working memory. Backend 10 and/or global agent 11 can further include a (non-volatile) memory.

Further disclosed is a computer program designed to carry out computer-implemented method 100 for preventing loss of function in a local instance 20 when there is a disturbance of a connection to a backend 10 in a communication system. The computer program can be for example in interpretable or in compiled form. It can be loaded (also in parts) into the RAM of a computer for execution e.g. as a bit or byte sequence. The computer program can include a plurality of parts, at least one part being executed on at least one local instance 20 and/or local agent 21 and another part being executed on backend 10 and/or global agent 11.

Also disclosed is a computer-readable medium or signal that stores and/or contains the computer program or at least a part thereof. The medium can include, for example, one of RAM, ROM, EPROM, HDD, SDD, . . . on/in which the signal is stored.

What is claimed is:

1. A computer-implemented method for preventing loss of function in a local instance when there is a disturbance of a connection to a backend in a communication system that has the local instance having a local agent and wherein the backend acts in part as a global agent, an agent designating a unit that is configured to achieve defined goals through autonomous behavior, the computer-implemented method comprising the following steps:

based on the connection to the backend being present, providing the function by the global agent which receives backend information from the backend during the providing of the function; and based on the connection to the backend being disturbed, providing the function by the local agent, wherein while the connection is present the local agent emulates a behavior of the global agent in order so that when the backend is disturbed the local agent provides the function in accordance with the emulated behavior by which the global agent would have provided the function had the connection to the backend not been disturbed, wherein while the connection is present the local agent learns to emulate the behavior of the global agent by continuously observing one or more actions performed and rewards received by the global agent, so that when the connection to the backend is disturbed the local agent provides the function by calculating a first action that is identical to a second action that the global agent would have calculated for a current state.

2. The computer-implemented method as recited in claim 1, further comprising:

observing, by the local agent, its current state in an environment;

calculating, by the local agent, a first action based on the current state, to provide the function when the connection to the backend is disturbed; and assuming, by the local agent, a new state.

3. The computer-implemented method as recited in claim 2, wherein a degradation signal indicates whether there is a risk of the disturbance of the connection of the local instance to the backend.

4. The computer-implemented method as recited in claim 3, wherein the degradation signal controls a switch in order to allow the first action calculated by the local agent to influence the environment when the connection to the backend is disturbed.

5. The computer-implemented method as recited in claim 3, wherein the degradation signal is generated by the backend or is generated based on a spontaneous connection disturbance or is generated by the local instance.

6. The computer-implemented method as recited in claim 2, wherein the calculating, by the local agent, the first action additionally being based on its current reward, and wherein the assuming of the new state includes receiving, by the local agent, a new reward.

7. The computer-implemented method as recited in claim 6, further comprising:

observing, by the global agent, its current state in the environment;

calculating, by the global agent, a second action based on its current state;

assuming, by the global agent, a further new state when the connection from the local instance to the backend is not disturbed.

8. The computer-implemented method as recited in claim 7, wherein the calculating, by the global agent, of the second action is additionally based on its current reward, and wherein the assuming of the further new state additionally includes receiving, by the global agent, a further new reward.

9. The computer-implemented method as recited in claim 8, where the backend acts in part as a plurality of global agents, and one global agent of the plurality of global agents receiving rewards from other global agents.

10. The computer-implemented method as recited in claim 2, wherein, as a basis for the observing of its current state in the environment, and/or for calculating the first action and/or for the assuming of the new state by the local agent, features are used that are also available to the local instance when the connection to the backend is disturbed.

11. The computer-implemented method as recited in claim 1, wherein: (i) the local instance being situated as a system in a vehicle, and/or (ii) the function is used for autonomous and/or assisted driving.

12. A computer-implemented method for preventing loss of function in a local instance when there is a disturbance of a connection to a backend in a communication system that has the local instance having a local agent and wherein the backend acts in part as a global agent, an agent designating a unit that is configured to achieve defined goals through autonomous behavior, the computer-implemented method comprising the following steps:
  based on the connection to the backend being present, providing the function by the global agent which receives backend information from the backend during the providing of the function;
  based on the connection to the backend being disturbed, providing the function by the local agent, wherein while the connection is present the local agent emulates a behavior of the global agent in order so that when the backend is disturbed the local agent provides the function in accordance with the emulated behavior by which the global agent would have provided the function had the connection to the backend not been disturbed;
  observing, by the local agent, its current state in an environment;
  calculating, by the local agent, a first action based on the current state, to provide the function when the connection to the backend is disturbed; and
  assuming, by the local agent, a new state, wherein the calculating, by the local agent, the first action additionally being based on its current reward, and wherein the assuming of the new state includes receiving, by the local agent, a new reward;
  observing, by the global agent, its current state in the environment;
  calculating, by the global agent, a second action based on its current state;
  assuming, by the global agent, a further new state when the connection from the local instance to the backend is not disturbed, wherein the calculating, by the global agent, of the second action is additionally based on its current reward, and wherein the assuming of the further new state additionally includes receiving, by the global agent, a further new reward, wherein the current reward of the local agent and/or the new reward of the local agent are the same as the current reward of the global agent and/or the further new reward of the global agent, so that the local agent learns to emulate the behavior of the global agent and, when the connection to the backend is disturbed, calculates the first action that is the same as the second action that the global agent would calculate if the connection to the backend existed.

13. A computer system configured to prevent loss of function in a local instance when there is a disturbance of a connection to a backend in a communication system that has the local instance having a local agent and wherein the backend acts in part as a global agent, an agent designating a unit that is configured to achieve defined goals through autonomous behavior, the computer system configured to:
  based on the connection to the backend being present, provide the function by the global agent which receives backend information from the backend during the providing of the function; and
  based on the connection to the backend being disturbed, provide the function by the local agent, wherein while the connection is present the local agent emulates a behavior of the global agent in order so that when the backend is disturbed the local agent provides the function in accordance with the emulated behavior by which the global agent would have provided the function had the connection to the backend not been disturbed, wherein while the connection is present the local agent learns to emulate the behavior of the global agent by continuously observing one or more actions performed and rewards received by the global agent, so that when the connection to the backend is disturbed the local agent provides the function by calculating a first action that is identical to a second action that the global agent would have calculated for a current state.

14. A non-transitory computer-readable medium on which is stored a computer program for preventing loss of function in a local instance when there is a disturbance of a connection to a backend in a communication system that has the local instance having a local agent and wherein the backend acts in part as a global agent, an agent designating a unit that is configured to achieve defined goals through autonomous behavior, the computer program, when executed by a computer system, causing the computer system to perform the following steps:
  based on the connection to the backend being present, providing the function by the global agent which receives backend information from the backend during the providing of the function; and
  based on the connection to the backend being disturbed, providing the function by the local agent, wherein while the connection is present the local agent emulates a behavior of the global agent in order so that when the backend is disturbed the local agent provides the function in accordance with the emulated behavior by which the global agent would have provided the function had the connection to the backend not been disturbed, wherein while the connection is present the local agent learns to emulate the behavior of the global agent by continuously observing one or more actions performed and rewards received by the global agent, so that when the connection to the backend is disturbed the local agent provides the function by calculating a first action that is identical to a second action that the global agent would have calculated for a current state.

* * * * *